Figure 1:
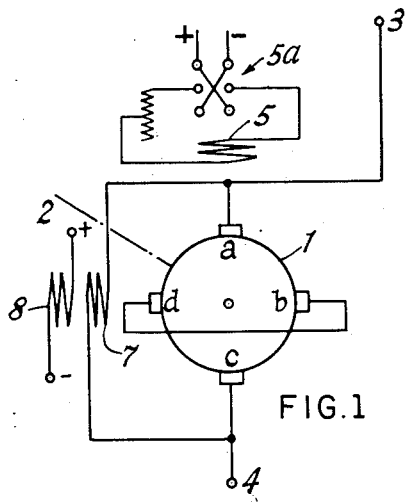

June 16, 1953   J. M. PESTARINI   2,642,556

ELECTRIC MOTOR OF THE METADYNE TYPE

Filed Sept. 20, 1946

INVENTOR.
Joseph M. Pestarini
BY Philip G. Hilbert
ATTORNEY

Patented June 16, 1953

2,642,556

UNITED STATES PATENT OFFICE 2,642,556

ELECTRIC MOTOR OF THE METADYNE TYPE

Joseph Maximus Pestarini, Staten Island, N. Y.

Application September 20, 1946, Serial No. 698,372

3 Claims. (Cl. 318—327)

This invention relates to a direct current electric motor of the metadyne type.

Conventional direct current motors generally operate with substantially constant voltage and when the value of the imposed voltage varies rapidly, the current may show dangerous peaks. This is particularly true of shunt excited motors, and to a lesser extent in the case of compound excited motors. With series excited motors, the current does not show peaks for a rapid variation in voltage, but the current has only limited values for given voltage and speed values. In order to reverse such motor, it is necessary to reverse the series field winding which requires switchgear adapted to carry heavy currents. Also, such a motor cannot function as a current supply source unless complicated switchgear is used.

An object of this invention is to provide a direct current motor which is adapted to operate satisfactorily when the imposed voltage varies between extreme limits, which does not show current peaks with a rapid variation in said voltage, which will readily absorb or supply any value of current within the limit of the intensity of the motor regardless of the voltage imposed or the rotational speed, providing such speed is above a predetermined value and which is adapted to pass from motoring to current supply by the use of simple, low current carrying switchgear.

A further object of this invention is to provide a motor of the character described which includes means adapted to supply operating characteristics arbitrarily selected with a wide range of limits.

Another object of this invention is to provide a motor having an operational characteristic allowing the same to develop any torque within a given range with but a slight deviation from a given speed, the value of such speed being arbitrarily defined and readily controlled.

The motor of the instant invention is of the direct current dynamoelectric type known as the metadyne, which has been described in applicant's Patents 2,055,240; 1,987,417; 2,038,380; 2,049,389 and 2,079,465.

The motor of the instant invention comprises essentially an armature having a set of primary brushes for connection to a source of voltage to be imposed on the machine and a set of short circuited secondary brushes. The current flowing between the secondary brushes creates a secondary flux which induces an electromotive force between the primary brushes. The induced electromotive force substantially balances the voltage impressed on the primary brushes. The motor further includes a stator having windings adapted to modify and control the operational characteristics of the motor. Some of the windings are located with their magnetic axis coincident with the axis of the flux derived from the line current traversing the armature and are adapted to control the direction and intensity of the current absorbed by the primary brushes. Other stator windings are located with their magnetic axis coincident with the axis of the flux derived from the secondary brushes and are adapted to limit the current carried by the short circuited secondary brushes.

The rapidly varying secondary current flowing between the secondary brushes quickly modifies the secondary flux, thus eliminating peaks of current when the voltage imposed on the primary brushes varies rapidly.

Figure 2:
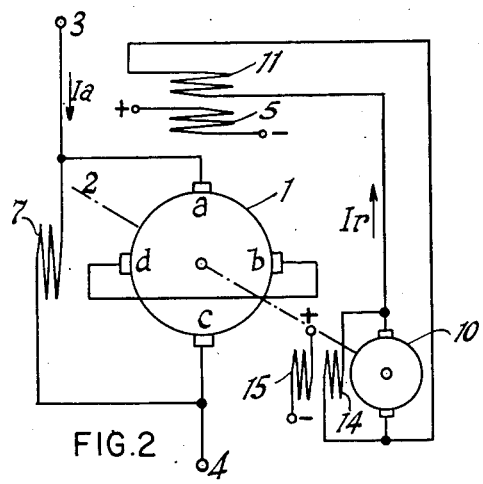
Figure 3:
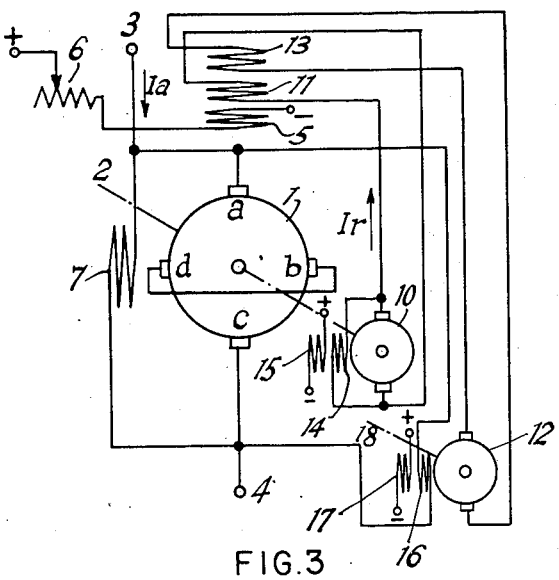

In the drawings illustrating embodiments of the invention, Fig. 1 is a schematic diagram of one form of motor and its connections; Figs. 2 and 3 show modifications thereof and Figs. 4, 5, 6, 7 and 8 show operational characteristics of motors embodying the invention.

Referring in detail to the drawings and particularly to Fig. 1, 1 designates a motor embodying the invention. The same includes an armature providing a pair of primary brushes $a$, $c$ which are connected to terminals 3, 4 upon which the voltage of a supply source is imposed. The armature rotates on shaft 2 and is also provided with a pair of short circuited secondary brushes $b$, $d$ which are displaced from primary brushes $a$, $c$.

The motor 1 further includes a plurality of stator windings 5, 7 and 8. The winding 5 is located with its magnetic axis coincident with the flux created by the armature ampere turns due to the primary current $Ia$ traversing the primary brushes $a$, $c$. The winding 5 is adapted to be energized by an independent source of direct current of selected value.

When no current is supplied to winding 5, then a small primary current creates a small primary flux which induces an electromotive force between the secondary brushes $b$, $d$ to supply a secondary current, which in turn creates a secondary flux adapted to induce between the primary brushes $a$, $c$, a voltage substantially equal to the voltage imposed on terminals 3, 4. With the secondary brushes short circuited, a slight primary flux, created by a very small primary current, is sufficient to give a very large secondary current. Thus, regardless of the voltage imposed on primary brushes $a$, $c$, a negligible primary current having a value $Iao$, traverses the motor 1, provided the speed $n$ of the motor is greater than a predetermined value. If, a current is supplied to winding 5 which creates ampere turns $W1$, a a supplementary primary current $Iaw$ is added to the previous primary current. Such supplementary current will create ampere turns compensating the ampere turns $W1$. Thus, the actual primary current $Ia = Iao + Iaw$.

Figure 4:
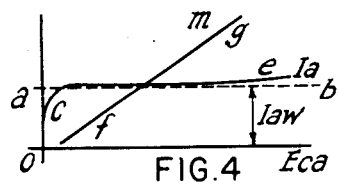

Since the current $Iao$ usually is negligible in respect to the current $Iaw$, the primary current will in effect be defined in direction and value by the ampere turns of winding 5. Such current will be independent of the voltage $Eca$ applied to the brushes $a$, $c$. As indicated in Fig. 4 wherein the current $Ia$ is plotted against the voltage $Eca$, the speed $n$ being assumed as constant, the curve $cde$ differs only slightly from the straight dotted line $a$, $b$ which is parallel to the abscissa, the ordinate of which is the current $Iaw$, except for a small initial segment corresponding to very low values of the primary voltage.

The value of the moment $m$, of the corresponding torque as plotted against the primary voltage $Eca$, is given by the curve $ofg$ which is practically a straight line. Thus, the moment $m$ is substantially proportional to the primary current and the secondary flux which, in its turn is proportional to the primary voltage $Eca$.

In order to pass from motoring to a braking condition, it is only necessary to reverse the direction of the ampere turns of winding 5. This is readily accomplished by the use of simple switch gear generally indicated at $5a$ in Fig. 1, for controlling the current supply to the winding which is of a relatively low value. Thus, no heavy current carrying circuit has to be modified.

In order to reduce the intensity of the secondary current in motor 1, stator windings 7 and 8 are provided. These windings are located with their magnetic axes coincident with the axis of the secondary flux and adapted to create ampere turns in the same direction and substantially equal to the armature ampere turns created by the original secondary current. The winding 7 is shunt connected across the primary brushes $a$, $c$, while the winding 8 is energized from an independent source of current.

Figure 5:
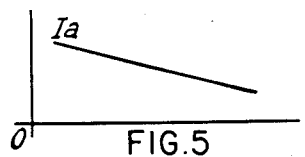

If an operational curve showing a decrease in primary current with an increase in primary voltage, is desired, as indicated by the inclined straight line curve of Fig. 5, then the winding 5 may be supplemented by another winding similarly located and shunt connected across the primary brushes of the motor.

Figure 6:
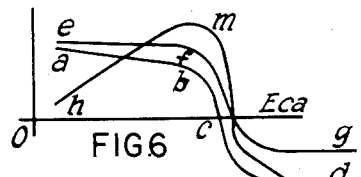

More elaborate operational curves such as shown in Fig. 6, may be obtained by the use of an auxiliary dynamo for energizing the supplemental winding located with its magnetic axis coincident with the axis of the primary flux, the dynamo being provided with a field coil shunt connected across the primary brushes of the motor and a second field coil excited from an independent source of current. The dynamo may be coupled to the motor. Such arrangement will give rise to the curve $abcd$. By adding a third winding also located with its magnetic axis coincident to the axis of the primary flux and shunt connecting the same across the primary brushes of the motor 1, curves $efg$ or $hmk$, may be obtained. The auxiliary dynamo is of the saturated iron type.

Figure 7:
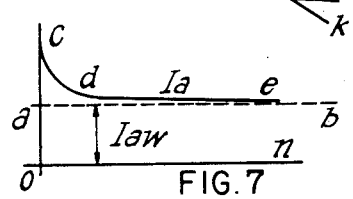
Figure 8:
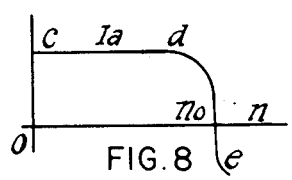

In Fig. 7, where the primary current is plotted against motor speed $n$, assuming the primary voltage $Eca$ to be constant, the curve $cde$ is obtained, such curve having an asymptote indicated by dotted line $ab$ which is parallel to the axis of the abscissa, the ordinate of which represents $Iaw$. In many cases it is desirable that the motor start and approach a given speed $n_o$, developing at said speed or in the neighborhood thereof, a positive or negative torque necessary to keep that speed substantially constant regardless of the load. This would require the primary current $Ia$ to take sharp drop at the speed $n_o$ as indicated by the curve $cde$ in Fig. 8.

Such an operational curve may be obtained by the use of a small auxiliary dynamo 10 which is mechanically coupled to the shaft 2 of motor 1, as shown in Fig. 2. Such a dynamo known as a regulator dynamo and described in a number of applicant's patents, has its excitation regulated so that the speed $n_o$ is the critical speed. The dynamo 10 is shunt excited by field coil 14 and further includes an independently energized field coil 15 for creating a number of substantially constant ampere turns and giving a slight degree of magnetism to the dynamo. The dynamo 10 supplies regulator current to a stator winding 11 located with its magnetic axis coincident with the axis of the primary flux. Regulator current may be supplied to winding 11 by other suitable means.

The ratio between the component $Iaw$ of the primary current and the ampere turns of the primary stator winding may be modified by using a stator winding having its magnetic axis along the axis of the primary flux and being traversed by the primary current, particularly, if the ampere turns created by such series connected winding have the opposite direction of the primary armature ampere turns. In that case, for a smaller value of ampere turns of the stator winding, a larger value of the component $Iaw$ will be obtained.

The value of the secondary current obtained for a given primary voltage and a given speed of the motor 1, may be modified by the use of a stator winding having its magnetic axis along the axis of the secondary flux and traversed by the secondary current, particularly if the ampere turns created by the secondary current traversing said stator winding have the same direction as the secondary armature ampere turns, in which case the secondary current diminishes.

It is understood that other operational characteristics may be obtained by the use of other series connected stator windings which are adapted to be traversed by primary or secondary current.

Any combination of stator windings previously indicated, may be used to obtain a desired operational characteristic. Thus, as shown in Fig. 3, the motor 1 includes stator windings 5, 11 and 13 located along the axis of the primary flux. Winding 5 is independently energized and controlled by rheostat 6 to create constant ampere turns. Winding 11 is energized by regulator dynamo 10, as previously described. Winding 13 is energized by an auxiliary dynamo 12 having saturated iron, a field coil 16 shunt connected across the primary brushes $a$, $c$ of motor 1 and a field coil 17 independently energized for creating a constant number of ampere turns. The dynamo 12 may be coupled to motor 1 through its shaft 18 or independently rotated at a constant speed. The stator winding 7 is located along the axis of the secondary flux and is shunt connected across the primary brushes $a$, $c$, as previously described.

The similarly located stator windings may be combined in a single winding which is energized by a dynamo electric machine of the amplifier metadyne type such as described in Patent 2,112,604. Thus, the single winding is adapted to combine the separate functions of the individual windings.

While there have been shown and described specific embodiments of the invention, it will be obvious that various changes and modifications can be made within the scope of the invention as indicated by the following claims.

Having now described and ascertained the nature of my invention and in what manner the same is to be performed, I declare that what I claim is:

1. An electric system comprising a direct current source and a variable voltage motor comprising an armature associated with a commutator having a set of two non-consecutive primary brushes and a set of short circuited secondary brushes per cycle and a plurality of stator windings, dynamo means for supplying current at speeds above a predetermined speed, means for connecting said primary brushes to said direct current source, a pair of said stator windings being disposed with their magnetic axis coincident with the flux created by the primary brush current traversing said armature, means for connecting one of said pair of stator windings with said dynamo means, means for energizing the other of said pair of stator windings with a predetermined constant current whereby the current supplied by said direct current source to said motor is controlled by said predetermined current and rapidly modified as the predetermined speed of said dynamo means is reached.

2. An electric system comprising a direct current source and a variable voltage motor comprising an armature associated with a commutator having a set of two non-consecutive primary brushes and a set of short circuited secondary brushes per cycle and a plurality of stator windings, an auxiliary dynamo provided with field windings, means for connecting said primary brushes to said direct current source, a pair of said stator windings being so disposed with their magnetic axis coincident with the flux created by the primary brush current traversing said armature, means for connecting one of said pair of stator windings with said auxiliary dynamo, means for energizing the other of said pair of stator windings with a predetermined current, means for energizing one of said field windings of said auxiliary dynamo with a predetermined current and means for connecting another of said field windings of said auxiliary dynamo to the primary brushes of said motor, whereby the current supplied by said direct current source to said motor is controlled by said first mentioned predetermined current energizing a stator winding of said motor metadyne and by the voltage induced between the primary brushes of said motor.

3. An electric system as in claim 2 wherein another of said stator windings is disposed with its magnetic axis coincident with the flux created by the primary brush current traversing said armature and further including a regulator dynamo for supplying current at speeds above a predetermined speed and means for connecting said regulator dynamo with said last mentioned stator winding.

JOSEPH MAXIMUS PESTARINI.

References Cited in the file of this patent

UNITED STATES PATENTS

| Number | Name | Date |
|---|---|---|
| 2,270,708 | Mirrill | Jan. 20, 1942 |
| 2,445,788 | Litman | July 27, 1948 |

FOREIGN PATENTS

| Number | Country | Date |
|---|---|---|
| 365,036 | France | June 15, 1906 |